(12) United States Patent
Kugitani et al.

(10) Patent No.: US 8,304,522 B2
(45) Date of Patent: Nov. 6, 2012

(54) SOY PROTEIN GEL AND METHOD OF PRODUCING THE SAME

(75) Inventors: Hirofumi Kugitani, Tsukubamirai (JP);
Masahiko Samoto, Tsukubamirai (JP);
Motoaki Nishiura, Tsukubamirai (JP)

(73) Assignee: Fuji Oil Company, Limited, Osaka (JP)

( * ) Notice: Subject to any disclaimer, the term of this patent is extended or adjusted under 35 U.S.C. 154(b) by 263 days.

(21) Appl. No.: 12/734,547

(22) PCT Filed: Oct. 6, 2008

(86) PCT No.: PCT/JP2008/068146
§ 371 (c)(1),
(2), (4) Date: May 7, 2010

(87) PCT Pub. No.: WO2009/060678
PCT Pub. Date: May 14, 2009

(65) Prior Publication Data
US 2010/0311950 A1   Dec. 9, 2010

(30) Foreign Application Priority Data

Nov. 8, 2007 (JP) .................................. 2007-291384

(51) Int. Cl.
*C07K 14/415* (2006.01)
*C12P 21/00* (2006.01)
(52) U.S. Cl. ...................................... 530/370; 435/68.1
(58) Field of Classification Search .................. 435/68.1; 530/370
See application file for complete search history.

(56) References Cited

U.S. PATENT DOCUMENTS
5,156,956 A   10/1992 Motoki et al.

FOREIGN PATENT DOCUMENTS

| JP | 58-149645 | 9/1983 |
| JP | 01-027471 | 1/1989 |
| JP | 10-056976 | 3/1998 |
| WO | 02/28198 | 4/2002 |
| WO | 2005/094608 | 10/2005 |
| WO | 2006/129647 | 12/2006 |

OTHER PUBLICATIONS

Tang et al. , Food Research International 39, 704-711 (2006).*
Mori et al. ,J. Agric. Food Chem. 29, 20-23 (1981)).*
International Preliminary Report on Patentability together with the English translation of the Written Opinion issued Jun. 29, 2010 in International (PCT) Application No. PCT/JP2008/068146.
International Search Report issued Oct. 28, 2008 in International (PCT) Application No. PCT/JP2008/068146.
Samoto et al., "Improvement of the Off-flavor of Soy Protein Isolate by Removing Oil-body Associated Proteins and Polar Lipids", Biosci. Biotechnol. Biochem., 62(5), pp. 935-940, 1998.
Chanyongvorakul et al., "Physical Properties of Soy Bean and Broad Bean 11S Globulin Gels Formed by Transglutaminase Reaction", Journal of Food Science, 60(3), pp. 483-488 and 493, 1995.
Samoto et al., "Abundant proteins associated with lecithin in soy protein isolate", Food Chemistry, 102, pp. 317-322, 2007.
Chinese Office Action issued Feb. 23, 2012 in corresponding Chinese Application No. 200880124702.3, with English translation.

* cited by examiner

*Primary Examiner* — Chih-Min Kam
(74) *Attorney, Agent, or Firm* — Wenderoth, Lind & Ponack, L.L.P.

(57) ABSTRACT

It is intended to provide a soy protein gel which has such gel properties that have never been obtained hitherto and is excellent in taste and color tone, and a soy protein food taking advantage of the gel properties. It has been found out that gel properties can be modified at an extremely elevated level and thus the desired soy protein gel can be obtained by preparing a gel by using a soy protein material in which the lipophilic protein content is reduced and conducting the gelation with the utilization of not only heat but also the action of a protein crosslinking enzyme.

10 Claims, No Drawings

SOY PROTEIN GEL AND METHOD OF PRODUCING THE SAME

This application is a 371 of PCT/JP2008/068146, filed Oct. 6, 2008, which claims the priority of Japan 2007-291384, filed Nov. 8, 2007.

TECHNICAL FIELD

The present invention relates to a soy protein gel and a method for producing the gel.

BACKGROUND ART

Soybean is an important food source and has been traditionally used in the production of soy food products such as boiled bean, soy milk, tofu, ganmo (fried tofu fritter), deep-fried tofu, frozen and dried tofu, natto (fermented soybeans), tempeh, miso, and soy sauce. The protein thereof is edible protein of good quality and has a variety of physical properties including gel properties, emulsifiability, and water retention properties. Traditionally, soy protein has been isolated from soybeans, and utilization of the protein in the food products has been promoted. In addition, in recent years, novel soy foods such as fabricated (hybrid) food products containing soy protein as a major ingredient have been proposed and established.

In particular, due to recent rising health concerns, there are increased needs for soybean-based food products and it is demanded to create values such as portability, convenience, gel texture improvement for increased ease of eating and drinking, in addition to values such as palatability and nutritional wellness.

Soybean storage proteins can be recovered with relative ease as a precipitated fraction by isoelectric precipitation at about pH 4.5. This fraction is usually used, i.e., in the form of a "soybean protein isolate," in the food manufacture industries. For example, a soybean protein isolate is used, with or without further processing, as an additive to other food materials for preparing daily dishes such as soy protein-based foods, meat products, and fish paste products, as well as favorite food such as snacks, nutritional bars, pastries and beverages; pure vegetable edible materials; and special purpose food products such as food preparations for patients allergic to milk or eggs and for patients with difficulty in chewing and/or swallowing, high protein content foods, and nutritionally balanced foods.

The soybean storage proteins are classified into 2S-, 7S-, 11S-, and 15S-globulins based on the sedimentation coefficients determined by ultracentrifugation analysis. Among them, 7S- and 11S-globulins are the main constituent protein components of the globulin fractions. On the other hand, Samoto et al. has reported that there is a group of proteins that have a high affinity for polar lipid which constitute membranes, including cell membranes, and protein body and oil body membranes among the proteins derived from soybeans (lipophilic protein), and that the lipophilic protein comprises as much as about 35% of an industrially produced soybean protein isolate (non-Patent Document 1).

The term "lipophilic protein" is a general term for a group of proteins that includes membrane proteins as major members of the group, particularly those with molecular weights of 34 kDa, 24 kDa and 18 kDa as estimated by SDS-polyacrylamide gel electrophoresis. These proteins are known to contain about 10 to 12% by weight of polar lipid which is extracted with a polar solvent mixture of chloroform:ethanol (2:1).

Thus, it has been revealed that lipophilic protein is included in the protein components of a widely-available soybean protein isolate, in addition to 7S- and 11S-globulins. It has become possible to fractionate these respective proteins from soybeans food-industrially (Patent Documents 1 and 2, and non-Patent Document 2).

However, the physical properties of the individual proteins, particularly those of the lipophilic protein, have not been fully elucidated.

On the other hand, methods are known for modifying edible proteins by cross-linking with transglutaminase. This enzyme catalyzes an acyl transfer reaction of the γ-carboxamide group of glutamine residue within a peptide chain. Transglutaminase forms a ε-(γ-Glu)-Lys cross-link within a protein molecule or between protein molecules by acting on the ε-amino group of lysine residue in the protein that acts as an acyl acceptor. When water acts as an acyl acceptor, deamidation reaction of a glutamine residue proceeds to form a glutamic acid residue. With respect to examples of the reaction of transglutaminase on soy protein, as shown in Patent Documents 3 to 5, gelling techniques comprising addition of transglutaminase to a soy protein-containing slurry have been disclosed.

REFERENCE DOCUMENTS

Patent Document 1: WO 2002/028198
Patent Document 2: WO 2006/129647
Patent Document 3: JP-A 58-149645
Patent Document 4: JP-A 64-27471
Patent Document 5: WO 2005/94608
non-Patent Document 1: Samoto M et al., Biosci. Biotechnol. Biochem., 62(5), 935-940, 1998
non-Patent Document 2: Samoto et al., Food Chemistry, 102, 317-322, 2007

DISCLOSURE OF THE INVENTION

Problems to be Solved by the Invention

In case of soy protein gels formed by heating soy protein materials, a difference in physical properties such as hardness or fragility of gels has a large effect on the suitability and/or preference for food products.

For example, for a soy protein gel with a relatively soft texture, there are needs for physical properties that facilitate easy swallowing and smooth sliding down the throat and are less collapsibility than tofu (incidentally, gels whose main raw material is polysaccharides such as agar or other materials such as gelatin are not a soy protein gel). By contrast, for a soy protein gel with a relatively hard texture, there are needs for physical properties that are flexible and hard like konjac (Amorphohallus konjac, glucomannan with water) foods preferred by both children and elderly people.

According to the reference documents listed above, it has been revealed that the gel properties exhibited vary depending on a particular fraction of fractionated soy proteins which constitute a conventional soybean protein isolate, or on whether the gel is denatured by heating or not. The reference documents also teach that there is no difference in the gelled state formed with transglutaminase among the precipitated soy protein (soybean protein isolate), 7S globulin, and 11S globulin.

However, no useful findings have been obtained only from conventional studies on how to achieve the properties described above.

Then, objects of the present invention are to provide a soy protein gel which has such gel physical properties that have never been obtained hitherto and is excellent in taste and color tone, and a soy protein food taking advantage of the gel physical properties. More specifically, an object of the present invention is to provide a soy protein gel with konjac-like hardness and a flexible texture or with a texture that facilitates easy swallowing and smooth sliding down the throat and is less collapsibility than tofu. Another object of the present invention is to utilize the gel in food products.

Means for Solving the Problems

In view of the objects described above, the present inventors have conducted extensive studies to investigate the physical behavior of fractionated soy proteins and the modifying effect of various enzymes and metallic salts on the physical properties of fractionated soy proteins. Surprisingly, the present inventors have found that gel properties can be modified at an extremely elevated level and thus the desired soy protein gel can be obtained by preparing a gel by using a soy protein ingredient (soy protein material) whose lipophilic protein content has been reduced and carrying out the gelation with the utilization of not only heat but also the action of a protein crosslinking enzyme.

Furthermore, by applying this finding, the present inventors have also found that the gelling ability induced by subjecting a material containing the soy protein ingredient having a reduced content of lipophilic protein to the action of a protein crosslinking enzyme can be used for modifying and improving the physical properties of food products, or for substituting soy protein for other food materials without making any change in the physical properties of food products.

That is, the present invention is:

1. A soy protein gel obtainable by heating a material comprising a soy protein ingredient, wherein the soy protein ingredient has a reduced lipophilic protein content, and wherein the gel has been subjected to the action of a protein crosslinking enzyme;
2. The soy protein gel according to the above 1, wherein the soy protein ingredient is selected from whole soymilk, defatted soymilk, soybean protein isolate, 7S soy protein, and 11S soy protein;
3. The soy protein gel according to the above 1, wherein the gel has a rupture stress of 50 to 1000 ($\times 1000$ N/m$^2$) and a rupture strain rate of 50 to 100%;
4. The soy protein gel according to the above 1, wherein the gel has a rupture stress of 5 to 50 ($\times 1000$ N/m$^2$) and a rupture strain rate of 40 to 80%;
5. A food product utilizing the soy protein gel according to the above 1;
6. A method for producing a soy protein gel, comprising using a soy protein ingredient whose lipophilic protein content has been reduced, subjecting a material comprising the soy protein ingredient to the action of a protein crosslinking enzyme, and then heating the material;
7. The method according to the above 6, wherein the pH of the material comprising the soy protein ingredient is 6 to 9 when subjecting the material to the action of a protein crosslinking enzyme;
8. The method according to the above 6, wherein salt is added to the soy protein ingredient in an amount of 1% or less by weight based on the material comprising the soy protein when subjecting to the action of a protein crosslinking enzyme;
9. The method according to the above 6, wherein the soy protein ingredient whose lipophilic protein content has been reduced is not subjected to preliminary heating at a temperature of its denaturation temperature or higher, and wherein, after subjecting to the action of a protein crosslinking enzyme, the material comprising the soy protein ingredient is heated at a temperature of the denaturation temperature of the soy protein ingredient or higher;
10. The method according to the above 6, wherein the soy protein ingredient whose lipophilic protein content has been reduced is subjected to preliminary heating at a temperature of its denaturation temperature or higher, and wherein, after subjecting to the action of a protein crosslinking enzyme, the material comprising the soy protein ingredient is heated at a temperature sufficient to inactivate the enzyme;
11. A soy protein ingredient characterized in that its lipophilic protein content has been reduced, that the ingredient has been subjected to the action of a protein crosslinking enzyme, and that the ingredient is used for the preparation of a soy protein gel;
12. A soy protein ingredient characterized in that its lipophilic protein content has been reduced, that the ingredient is used after subjecting it to the action of a protein crosslinking enzyme, and that the ingredient is used for the preparation of a soy protein gel;
13. The food product according to the above 5, wherein the soy protein gel is prepared in advance and then mixed; and
14. The food product according to the above 5, wherein the soy protein ingredient whose lipophilic protein content has been reduced and a protein crosslinking enzyme are blended in raw materials of the food product, and the soy protein gel is formed during the production process.

Effects of the Invention

According to the present invention, it is possible to obtain a soy protein gel having novel properties that could not have been achieved by conventional soy protein gels such as soft texture that provides a smooth slide down the throat or hard texture with flexibility. These properties can lead to creation of novel gelled food products from soy proteins.

In addition, since the soy protein gel of the present invention is excellent in taste and flavor without giving an unpleasant feel of taste derived from soybean, it is possible to prepare bland foods that have been difficult to prepare heretofore, or to season soy foods differently from traditional ones to, for example, a pleasant dessert flavor. Thus, the present invention can expand the variation of new soy foods.

Furthermore, the soy protein gel according to the present invention can be used to modify and improve the physical properties of food, or to substitute soy proteins for main raw materials of existing food products without making any change in the physical properties of the food products.

BEST MODE FOR CARRYING OUT THE INVENTION

Hereinafter, the embodiments of the present invention will be explained in detail.

The soy protein gel of the present invention can be obtained by heating a material containing a soy protein ingredient. The soy protein ingredient has a reduced content of lipophilic protein, and the gel is characterized in that it has been subjected to the action of a protein crosslinking enzyme. The method for preparing the protein gel of the present invention uses, as a raw material, the soy protein ingredient having a reduced content of lipophilic protein, and the method is characterized in that, after subjecting a material containing the soy protein ingredient to the action of a protein crosslinking enzyme, the material is heated.

(The Soy Protein Ingredient)

As used herein, the term "soy protein ingredient" refers to a material of extracted soybean-derived protein, specifically a material obtained by extracting protein from whole or defatted soybeans and then, if necessary, by purifying the protein. Examples of the soy protein ingredient include whole soymilk, skimmed soymilk, soybean protein isolate, 7S soy protein and 11S soy protein, and a mixture thereof. Insoluble soy fiber (okara) may be contained therein as long as protein is extracted therein.

Besides, as described in Patent Document 2, 11S soy protein refers to the soy protein ingredient whose 11S globulin (also referred to as glycinin) purity is raised, and the content of 11S globulin per soy protein is at least 45% or higher; in particular, preferably 75% or higher, more preferably 85% or higher, and even more preferably 90% or higher.

Further, 7S soy protein refers to the soy protein ingredient whose 7S globulin (also referred to as 13-conglycinin) purity is raised, and the content of 7S globulin per soy protein is at least 25% or higher; in particular, preferably 40% or higher, more preferably 50% or higher, and even more preferably 60% or higher.

On the other hand, in a conventional soybean protein isolate which is not subjected to the fractionation into 7S and 11S fractions, the 11S protein content per soy protein is about 30 to 40%, and the 7S protein content is about 13 to 22%.

The 7S- and 11S-globulin contents per soy protein in the soy protein ingredient can be determined by SDS-polyacrylamide gel electrophoresis (SDS-PAGE). The analysis is carried out according to the method of Laemmli (Nature, 227, 680, 1970) using a 10 to 20% gradient gel, the gel is then stained with Coomassie brilliant blue (CBB), followed by measurement of the migrated pattern with a densitometer. The purity is calculated as the area ratio of the protein to the total protein area. The 7S globulin content is the total of the contents of the $\alpha, \alpha'$, and $\beta$ subunits, and the 11S protein content is the total of the contents of the acidic polypeptide (A) and the basic polypeptide (B).

The soy protein ingredients exemplified above can all be obtained using a known method. In case of 11S- and 7S-soy proteins, for example, the soy protein ingredient adjusted to the composition as described above can be obtained from a product such as soy milk and a soybean protein isolate, prepared from soybeans with a conventional composition using a technique for fractionating 7S- and 11S-proteins. Any conventionally known method can be used as the technique for fractionating and removing 11S protein. For example, a technique that allows for the production at an industrial scale such as disclosed in WO 2000/58492, WO 2002/028198, WO 2004/043160, or WO 2006/129647 can be employed. The soy protein ingredient adjusted to the composition as described above can also be obtained using a conventional method from soybeans in which the entire or a part of the gene for 7S- or 11S protein has been deleted by genetic engineering or breeding (Breeding Science, 46, 11, 1996). A fractionating technique as described above and genetically deficient soybeans can be used in combination.

(Reduction of Lipophilic Protein in Soy Protein Ingredient)

It is essential for the soy protein ingredient used for the soy protein gel of the present invention to have, in particular, a reduced content of, or to remove "lipophilic protein" (hereinafter, sometimes, referred to as "LP").

Among the acid-precipitable soybean proteins, LP refers to a group of minor acid-precipitable soybean proteins other than 7S- and 11S-globulins. LP is associated with much polar lipid such as lecithin and glycolipid. Hereinafter, sometimes, they are simply referred to by the abbreviation "LP". LP includes proteins that mainly have molecular weight of 34 kDa, 24 kDa and 18 kDa, estimated by SDS-PAGE, lipoxygenase, γ-conglycinin, and many other miscellaneous proteins.

In case of 7s- and 11S-soy proteins, the reduction of LP can be achieved by preparing these proteins by any of the methods described above, particularly, the method described in WO 2002/028198, WO 2004/043160, or WO 2006/129647. Further, these fractionated proteins, soy milk, and soybean protein isolates can also be achieved by centrifugation of an aqueous protein solution at a relatively high force, followed by removal of the precipitate. The extent of LP reduction can be confirmed by calculating an estimated LP content (Lipophilic Protein Content Index, hereinafter abbreviated as "LCI"), which is a simple estimation of the LP content obtained by selecting main proteins for respective of 7S-, 11S- and LP-proteins, and calculating a CBB-staining ratio in an SDS-PAGE of the proteins. The calculation of LCI value is carried out according to the method described in the section, [Method for estimating LP content], (a) to (d) and (Table 1) of the present applicant's Patent Document 2 (WO 2006/129647), and they are calculated by the equation shown by (Equation 1). The details of the method are described below. The LCI value of the soy protein ingredient of the present invention is 38% or less, preferably 35% or less, more preferably 30% or less, even more preferably 25% or less.

[Method for Estimating LP Content]

(a) As the main proteins, the $\alpha$ and $\alpha'$ subunits ($\alpha+\alpha'$) are selected for 7S, the acidic subunit (AS) is selected for 11S, and the 34 kDa protein and lipoxygenase (P34+Lx) are selected for LP. Then, the staining ratio of respective selected proteins by SDS-PAGE is calculated. The electrophoresis can be carried out under the conditions shown in the following table.

(b) X (%) is calculated made according to the equation:

$$X(\%)=(P34+Lx)/\{(P34+Lx)+(\alpha+\alpha')+AS\}\times 100(\%).$$

(c) The LP content of a soybean protein isolate prepared from a low-denatured defatted soybeans is about 38% as determined according to the above fractionation methods 1 and 2 before the heat-sterilization. Then, the value of (P34+Lx) is multiplied by the correction coefficient k*=6 so that the value X becomes 38(%).

(d) That is, the estimated LP content (Lipophilic Protein Content Index, hereinafter abbreviated as "LCI") is calculated according the following Equation 1.

| <Conditions for electrophoresis> | |
| --- | --- |
| Amount to be applied | 10 μl of 0.1% protein sample solution per well |
| Well width | 5 mm |
| Well volume | 30 μl |
| Stain solution | 1 g of Coomassie brilliant blue (CBB), 500 ml of methanol, and 70 ml of glacial acetic acid (After CBB is dissolved completely in methanol, acetic acid and water are added, and then the solution is adjusted to 1 L) |
| Staining time | 15 hours |
| Destaining time | 6 hours |
| Densitometer | GS-710 Calibrated Imaging Densitometer/Quality One Software Ver. 4.2.3 (Bio Rad Japan Co. Ltd) Scanning width: 5.3 mm, Sensitivity: 30 |

$$\text{LCI }(\%)=\{k^*\times(P34+Lx)/(k^*\times(P34+Lx)+(\alpha+\alpha')+AS)\}\times 100 \qquad \text{Equation 1}$$

k*: Correction coefficient (6)

P34: 34 kDa protein, a main component of LP

Lx: lipoxygenase, a main component of LP
α: α subunit, a main component of 7S
α': α' subunit, a main component of 7S
AS: the acidic subunit, a main component of 11S As compared with the soy protein ingredient whose lipophilic protein content has been reduced, a soy protein ingredient whose lipophilic protein content is not reduced gives an unpleasant feel of taste and is inferior in taste and flavor. In addition, the physical properties of the gels made from such an ingredient becomes unsatisfactory due to a reduction in a rupture stress when it is reacted with transglutaminase as described hereinafter.

While the soy protein ingredient of the present invention can be used in a powder form, it can also be used in a liquid form as such. Where the gelling process is considerably remote or the storage of a material containing the soy protein ingredient is desired before the gelling process, the soy protein ingredient can be concentrated, frozen or processed into a powder before or after adding transglutaminase as described hereinafter.

(Material Containing Soy Protein Ingredient)

The soy protein ingredient is dispersed into water and, if necessary, other ingredients at a suitable concentration to use for the preparation of the soy protein gel. The material containing the soy protein ingredient can be prepared into any desired form such as clay, paste, slurry, and liquid.

Other ingredients which are contained, if necessary, in the material containing the soy protein ingredient can be selected from, for example, natural products of animal, vegetable, microbial, mineral, organic, and inorganic origins, or extracts or processed products thereof, or a mixture thereof. Examples thereof include products of animal origin such as thin slices of meat, minced meat, paste of meat, fish fillet, minced fish, fish paste, processed egg and diary products; products of vegetable origin, cereals such as corn and wheat, legumes such as soybean and red bean (azuki), root vegetables such as radish and carrot; organic materials such as fats and oils, carbohydrates, sugars, amino acids and peptides; and inorganic materials such as salts.

(Action of Protein Crosslinking Enzyme)

In addition to the use of the above-described soy protein ingredient, it is of importance that the soy protein gel of the present invention is subjected to the action of the protein crosslinking enzyme. By subjecting to the action of the protein crosslinking enzyme, the soy protein gel can be modified to a gel with a soft texture that provides a smooth slide down the throat or to a gel with a hard texture with flexibility. The protein crosslinking enzyme is that catalyzes the formation of a crosslink between protein molecules, and examples thereof include an enzyme catalyzing the ϵ-amino group-involving condensation reaction such as an enzyme catalyzing the amino group-involving condensation reaction between a glutamic acid residue [—(CH2)2-CO—NH2] and a lysine residue [NH2-(CH2)4-], and the condensation reaction between an aspartic acid residue [—CH2-CO—NH2] and a lysine residue. A typical example thereof is transglutaminase (EC 2.3.2.13) which catalyzes the condensation between glutamic acid and lysine residues. There is no particular limitation for the origin of transglutaminase, and transglutaminase of any origin including animal, microbial, and vegetable origins can be used. A purified enzyme can also be used, or commercially available enzyme preparations such as those of the "Activa" series (Ajinomoto, Co.) can be used.

Although the amount of transglutaminase to be added varies depending on the solid content of the soy protein ingredient used or the material containing the soy protein ingredient, a preferred amount is such that the material containing the soy protein ingredient forms an agar-like gel with a crunchy texture after the enzymatic reaction. Such an amount can be appropriately determined by one skilled in the art by observing the state of the gel. Specifically, a transglutaminase preparation can be added in an amount of 0.1 to 5 units per 1 g of crude protein of the soy protein ingredient contained in the material. It is preferred to increase the lower limit of the unit number when the solid content of the material becomes lower, for example, the amount can preferably be 0.75 units or more, and more preferably 1.5 units or more. The lower limit of the unit number can be reduced when the solid content of the material becomes higher, for example, the amount can preferably be 3.2 units or less, and more preferably 1.6 units or less.

The pH and temperature at which the material is subjected to the action of the protein crosslinking enzyme can be appropriately selected by one skilled in the art with reference to the optimal pH and temperature for the substrate of the enzyme. Further, it is preferred to select the reaction pH in view of the gel physical properties of the soy protein. For example, the optimal pH of a commercially available transglutaminase preparation ranges from pH 5 to 8, and preferably from pH 6 to 7. Polymerization by the crosslinking reaction tends to proceed in such a pH range.

However, such a pH range is not necessarily desirable for the formation of the soy protein gel (particularly for 11S soy protein). For example, when an attempt is made to obtain a soy protein gel utilizing the action of transglutaminase on a material containing 11S soy protein at a concentration of 12% by heating, a gel formed at a pH of about 5.5 has a dry and crumbling texture with considerable syneresis; a gel formed at a pH of about 6.5 bends at its middle portion and sharply breaks; and a gel formed at a pH of 7.5 to 8.5 becomes a preferred one which has a konjac-like texture that bends and finally snaps. Thus, there is a slight difference between the optimal reaction pH for crosslinking in terms of enzymatic chemistry and that in terms of the preferred physical properties. That is, the reaction pH for improving the physical properties should be selected from the range much higher than 4.5, the isoelectric point of soy protein, and from the range at which transglutaminase can be reactive; that is, pH of 6 to 9 is preferred.

(Influence of Addition of Salt)

When adding salt (table salt) to the soy protein gel, the amount of salt added to the material containing the soy protein ingredient is important because it has an influence on the gel physical properties. In particular, when the amount of salt added is in such a range that the solubility of soy protein is lowered, favorable physical properties cannot be achieved probably because the retention of water by the gel network becomes lower. For example, when no salt is added to the material containing 11S soy protein at a concentration of about 12% (pH 7.5), the preferred konjac-like gel which bends and finally snaps can be formed. By contrast, when salt is added to the material to obtain a soy protein gel, a gel formed with addition of salt in an amount of about 0.6% by weight based on the material has a relatively dry and crumbling texture with a certain degree of syneresis, and a gel formed with addition of salt in an amount of about 1.2% by weight based on the material has a dry and crumbling texture with considerable syneresis. When the amount of salt added is further increased up to about 1.8% by weight based on the material, thereby increasing the solubility, the gelling ability is again exhibited in view of physical properties to form a gel which bends at its middle portion and sharply breaks, while salty taste is produced. As described above, the amount of salt added to the material containing the soy protein ingredient can be selected according to the desired taste and physical properties. The amount of salt added is preferably 1% or less, or alternatively 1.6% or more by weight based on the material.

(Modification of Soy Protein Gel by Heating)

In order to obtain the soy protein gel of the present invention, it is essential to heat the above-described material containing the soy protein ingredient. By heating, the gel obtained by subjecting the material to the action of the protein crosslinking enzyme can be modified so that it has the physical properties intended by the present invention, as well as the enzyme is inactivated. For example, a gel can be formed only by subjecting the material containing 12% of the soy protein ingredient whose LP content has been reduced to the action of the protein crosslinking enzyme. However, like an agar gel, the gel formed becomes fragile and hardly bends. Heating after the enzymatic reaction can provides the gel with a characteristic texture like konjac that bends and finally snaps.

Any known methods can be used for heating. For example, specific heating conditions are as follows. In case where the soy protein ingredient in which the LP content is reduced is not subjected to preliminary heat denaturation at a temperature in its intrinsic denaturation temperature range or higher, the rupture stress of the gel reaches a maximum by heating the gel at a temperature in its intrinsic denaturation temperature range or higher.

The endothermic peak of 11S globulin appears between 80 and 92° C. and the endothermic peak of 7S globulin appears between 67 and 78° C. as determined by differential thermal calorimetry.

Thus, in order to increase the rupture stress, for example, in case that unmodified 11S soy protein is heated after reacting it with the protein crosslinking enzyme, it is appropriate to heat the protein at a temperature of 80 to 120° C., or preferably 85 to 100° C., for 1 to 60 minutes, or preferably 10 to 40 minutes. The rupture stress of the gel reaches a maximum by heating at 90° C. for 30 minutes.

In case that unmodified 7S soy protein is heated after reacting it with the protein crosslinking enzyme, it is appropriate to heat the protein at a temperature of 70 to 120° C., or preferably 75 to 100° C., for 1 to 60 minutes, or preferably 10 to 40 minutes. The rupture stress of the gel reaches a maximum by heating at 80° C. for 30 minutes. The rupture stress is low when the gel is not heated, and it tends to be also low when the gel is heated at 120° C. for 10 minutes, probably due to the history of overheating. In case of other soy protein ingredients containing both 7S globulin and 11S globulin, they are heated according to the conditions for 11S globulin having a high endothermic peak.

On the other hand, when the soy protein ingredient having reduced LP content is subjected to preliminary heat denaturation at a temperature in the intrinsic denaturation temperature range of the protein contained therein or higher with a heating means such as a direct steam injection, indirect heating, Joule heating or microwave heating, the material significantly exhibits its cooling gel formation capability. Then, it is possible to obtain the gel having a high rupture stress even without heating of the above-described level. Thus, the gel of the present invention can be obtained only by heating sufficient to inactivate the protein crosslinking enzyme. The conditions for heating sufficient to inactivate the protein crosslinking enzyme depend on the properties of an enzyme preparation. For example, heating at 80° C. or higher for about 30 minutes can be employed. However, 120° C. or lower is preferred because heating at higher than 120° C., the rupture stress tends to lower probably due to excess heat history.

(Physical Properties of Soy Protein Gel)

As described above, the soy protein gel of the present invention can be appropriately prepared into gels with various physical properties according to its intended use by selecting conditions such as the soy protein ingredient, heating conditions, and enzymatic reaction conditions. The physical properties of the soy protein gel of the present invention can be expressed numerically as a combination of the rupture stress and the rupture strain rate.

For example, when preparation of the gel with flexible and hard physical properties is desired, it is preferable to have a rupture stress of 50 to 1000 ($\times$1000 N/m$^2$), or preferably 100 to 800 ($\times$1000 N/m$^2$), and to have a rupture strain rate of 50 to 100%. In particular, when preparation of the konjac-like gel is desired, it is preferable to have a rupture stress of 150 to 250 ($\times$1000 N/m$^2$). When preparation of the kamaboko (boiled fish paste)-type gel is desired, a rupture stress of 250 to 600 ($\times$1000 N/m$^2$) is preferred. In such preparation, the concentration of the soy protein ingredient in the material containing the soy protein ingredient can be selected from the range of 1 to 50% by weight, preferably 11 to 30% by weight, and more preferably 11 to 20% by weight.

When preparation of the gel with smooth and soft physical properties is desired, a rupture stress of 5 to 50 ($\times$1000 N/m$^2$) and a rupture strain rate of 40 to 80% are preferred. In such preparation, the concentration of the soy protein ingredient in the material containing the soy protein ingredient can be selected from the range of 1 to 10% by weight, preferably 5 to 10% by weight, and more preferably 7 to 10% by weight.

These physical property values are determined at room temperature by rupture strength analysis using a rheometer (Yamaden Co., Ltd., etc). The measurement conditions are as follows: the sample height is 20 mm; the penetration speed is 1 mm/second; and a ball of 5 mm diameter is used in the plunger for gels with hard physical properties and a ball of 15 mm diameter is used for gels with soft physical properties. The rupture stress is determined by applying Equation 2 to the rupture load obtained by the rupture strength analysis, and the rupture strain rate is determined by applying Equation 3 to the rupture distortion obtained by the rupture strength analysis.

$$\text{Rupture Stress}(Y) = F \times 9.8/(r \times r \times 3.14) \times 1000 \qquad \text{Equation 2}$$

wherein F is rupture load (g), and r is the diameter of the plunger.

$$\text{Rupture Strain rate}(X) = T/h \times 100, \qquad \text{Equation 3}$$

wherein T is rupture distortion (mm), and h is sample height (mm).

It is almost possible to express the hardness of gel as the rupture stress Y, and the flexibility of gel as rupture strain rate X. In addition, the "rupture index Z" can be used to express the elasticity of gel. The rupture index Z represents how good the fit of the locus of the curve from the coordinate origin (0, 0) to the rupture point P (a, ma) of the waveform data obtained by rupture strength analysis that is drawn in a coordinate system in which the vertical axis represents the rupture stress Y and the horizontal axis represents the rupture strain rate X with the assumed perfect elastic body that passes through the coordinate origin and the rupture point P. The rupture index Z is calculated according to the Equation 4 shown below.

$$\text{Rupture Index } Z = \int_0^a \{f(x) - mx\}\, d(x) \Big/ \int_0^a \{mx\}\, d(x) \times 100 \qquad \text{Equation 4}$$

According to the evaluations of commercially available gelled food products, it has been shown that when a value of the rupture index Z is positive or nearly 0%, gels having such a value are not elastic, whereas, when a value of the rupture index Z is negative and it is sufficiently low, such as Z=−40%, gels having such a value are very elastic.

For example, preparation of a flexible and elastic gel, such as konjac and kamaboko, is desired, it is suitable to make the rupture index Z be −10% to −80%, preferably −15% to −60%, and more preferably −20% to −40%.

(Texture and Color Tone of Soy Protein Gel)

The soy protein gel obtained by the present invention is characterized by the excellent texture and color tone as compared with conventional soy protein gels.

Soy protein gels in which the LP content is not reduced would give an unpleasant feel of taste derived from soybean and are poor in texture. Among the soy protein ingredients, the gel in which 11S soy protein is used has an excellent texture with the least unpleasant taste. Further, the 11S soy protein gel has the least dull and yellowish color, and it is advantageous in applications where such a color tone is desired.

In contrast, the 7S soy protein gel is yellowish and has a transparent appearance. The gel comprising both 7S and 11S soy proteins has less dullness and yellowishness. Thus, removal of LP has an improving effect on the color tone in addition to the physical properties and texture.

(Application of Soy Protein Gel to Food Product)

The soy protein gel of the present invention can be utilized in various gel-based food products by taking advantage of its characteristic physical properties and color tone. Embodiments in which the soy protein gel is utilized in food products include, as a matter of course, the use of the soy protein gel prepared preliminarily for processing into food products without any further processing, and the use for mixing the gel into food products. Also included is the use as a mixture of the soy protein ingredient in which the LP content is reduced and the protein crosslinking enzyme blended together with other raw materials, which is afterward used for forming the gel. In the latter case, it is possible to substitute the other food materials as raw materials with soy proteins in order to improve the physical properties of known food products or otherwise, without making any change in the physical properties of the food products.

For preparing the soy protein gel in advance and utilizing it, for example, the gel can be used in the production of foods that satisfy the needs for soy food products with a novel texture and for food products with low sugar, low fat and high protein contents. Further, the gel can be used in the production of foods with a flexible texture for taking nourishment of soybean origin such as goumi (silverberry) candies, nutritional bars and nutritional jelly. The gel can also be used as a konjac substitute in the preparation of daily dishes such as oden and cooked rice.

Also included in the use of the gel are, for example, the use as substitutes for materials with a pleasant elastic texture such as pork gelatin and fibrous beef; the use for preparing pure plant-based food products without use of fish meat such as minced fish or meat such as minced meat; the use as seafood flavored gels such as abalone- and scallop-flavored gels, which are prepared, if necessary, by making cuts in the gel; the use for adding a heterogeneous texture to foods such as hamburger, sausage, Chinese meat dumplings, and steamed meatball dumplings, in which chopped gel is mixed with food ingredients; and the use as ingredients of, for example, gratin and stew by cutting the gel in a suitable size; and the use for topping, for example, pizza by finely slicing gels.

Further, in the process for forming the gel, it can be molded, for example, into thin films and used as substitutes for soft rice paper used for preparing raw spring rolls; substitutes for dried layer for making sushi to roll the ingredients; and substitutes for dried soybean casein; substitutes for seaweed; and used as salad toppings.

Furthermore, the gel can be molded into a sheet shape and then processed into, for example, imitation crab legs which are prepared by cutting the gel sheet into long strips, which are then bundled to mimic crab legs. The gel can also be molded into a long sheet for noodle preparations such as nutritional noodles with a flexible texture. It can be used, for example, as dumpling casings and lasagna. It can be further used as substitutes for films of crepe-style fried egg for rolling salad or sushi.

In addition, the gel can be molded into a spherical shape and used as fish egg substitutes or in eye-pleasing items by suspending spherical gels into nutritional drinks. It can be sweetened and brightly colored to be used for topping Japanese- or Western-style confectionery. By selecting a mold by reference to plastic molding, the gel can be molded in various shapes such as a shape of goldfish to help enjoy meal. Moreover, the gel can be dipped into miso paste, soy sauce, sauce, or soup, or be used in daily dishes such as vegetables preserved in soybean paste and food boiled in soy sauce. The gel can also be used as an ingredient of miso soup and soup. In addition, the gel can be used in food preparations for patients with difficulty in chewing and/or swallowing.

Next, the gel can also be formed by blending the soy protein ingredient whose LP content has been reduced and the protein crosslinking agent in raw materials of food in its production process. For example, the soy protein ingredient whose LP content has been reduced and the protein crosslinking agent are blended in raw materials of food such as meat products (e.g. hamburger, sausage and ham), fish meat products (e.g., various kamaboko inclusive imitation kamaboko with crab, scallop and abalone flavor, fried kamaboko, steamed kamaboko, and roasted kamaboko, tubular rolls of boiled and grilled fish paste, and fishballs), dairy products (e.g., cheese and yogurt), egg products (e.g., fried egg and Japanese style egg custard), cereal products (e.g., rice cakes and noodles), imitation foods as substitutes for meat and seafood, and functional foods such as low-carbohydrate foods, high-protein foods, foods for dysphagia, and soy protein-based foods, followed by subjecting the raw materials of the action of the enzyme.

The gel can also be used in non-food products (e.g., pet foods, feedstuff and fertilizers as well as water retention agents for greening the desert and water-based paints) as long as the blend is an aqueous system in which the soy protein ingredient whose LP content has been reduced can react with the protein crosslinking enzyme.

More specifically, the gel can be used for the above described food products by considering the physical properties of a gel formed by the soy protein gel of the present invention and raw materials of food, and by appropriately modify factors including the mixing amount of the soy protein material, the amount of the protein crosslinking enzyme to be added, pH of the material, the salt concentration, the amount of added fats and oils, the amount of added sugar, and the amounts of minerals (e.g., Ca and Mg).

For example, somewhat fragile properties of sausage can be modified to flexible properties by replacing a portion of minced meat with the soy protein whose LP content has been reduced and then by reacting the protein with the protein crosslinking enzyme. A hybrid kamaboko of minced fish and soy protein can be produced with keeping almost all original physical properties of kamaboko, which is characterized by flexibility, by replacing a portion of the minced fish with the soy protein whose LP content has been reduced and then by subjecting the protein to the action of the protein crosslinking enzyme.

(Soy Protein Ingredient for Preparation of Soy Protein Gel)

In view of the above findings, the present invention is characterized in that, in addition to provide the characteristic soy protein gel and food product using the gel, it provides the soy protein ingredient for the preparation of the soy protein gel so that consumers and manufacturers are readily able to prepare such soy protein gel and apply it to a variety of food products. The soy protein ingredient is characterized in that whose LP content has been reduced and that it has been subjected to the action of a protein crosslinking enzyme.

The present invention also provides the soy protein ingredient which enable manufacturers themselves to readily prepare the soy protein gel of the present invention by subjecting the ingredient to the action of the protein crosslinking enzyme. The soy protein ingredient is characterized in that whose LP content has been reduced, and is used by subjecting the ingredient to the action of the protein crosslinking enzyme in the production of food.

These soy protein ingredients can be prepared as the above described various types of soy protein ingredients such as 7S- and 11S-soy proteins, and soybean protein isolate, depending, for example, on the desired uses, viscosity, color tone, and physical properties. These ingredients can be distributed and marketed in different forms such as frozen form and dry form.

EXAMPLES

Preparation of Soy Protein Ingredient Whose LP Content has Been Reduced

The soy protein ingredient whose LP content had been reduced was prepared as described below according to the method described in non-Patent Document 2 (Samoto et al., Food Chemistry, 102, 317-322, 2007).

1) Slurry extracted with warm water from low-denatured defatted soybeans (70% NSI) that had been heat-treated to reduce NSI (Nitrogen Solubility Index) was centrifuged to remove an okara fraction to obtain defatted soymilk.

2) The defatted soymilk was further centrifuged to remove a further precipitated poorly-soluble fraction. This fraction is composed of lipophilic proteins with relatively low hydrophilicity and hereinafter is referred to as "poorly-soluble LP." Subsequently, the pH of the remaining supernatant was adjusted to pH 5.8, and the precipitated curd fraction was recovered by centrifugation. This fraction is that of 11S soy protein, and is referred to as "11S protein."

3) Next, the remaining supernatant was adjusted to pH 5.0 and allowed to stand for 10 minutes at 55° C. Then, it was adjusted to pH 5.5, and the precipitated curd fraction was recovered by centrifugation. As with the poorly-soluble LP fraction described above, this fraction is also composed of lipophilic proteins and is referred to as "LP."

4) Subsequently, the pH of the remaining supernatant was adjusted to pH 4.5, and the precipitated curd fraction was recovered by centrifugation. This fraction is composed of 7S soy protein, and is referred to as "7S protein."

5) From each of the fractions thus obtained (11S protein, 7S protein, and LP), two types of the soy protein ingredients were prepared as follows: the non-denatured soy protein ingredient (A) was prepared by neutralization without heat-treatment, followed by spray drying; and the denatured soy protein ingredient (B) was prepared by neutralization followed by heat-treatment at 140° C. for 10 seconds and then spray drying.

6) The dry matter yield ratio obtained by this procedure was about 2:2:1 (11S protein:LP:7S protein). A type of the soy protein ingredient in which 11S protein (A), LP (A) and 7S protein (A) are mixed at a ratio of 2:2:1 was obtained. This ingredient is referred to as "protein free of poorly-soluble LP," because only the poorly-soluble LP fraction is excluded therefrom.

7) A type of the soy protein ingredient in which 11S protein (A) and 7S protein (A) are mixed at a ratio of 2:1 was obtained. This material is referred to as "LP-free protein," because both the poorly-soluble LP fraction and the LP fraction described in 3) are excluded therefrom.

(Preparation of Soy Protein Ingredient Whose LP Content is Not Reduced)

Separately, according to Patent Document 5, a soy protein ingredient whose LP content was not reduced, i.e. soybean protein isolate, was prepared as follows.

1) Slurry extracted with warm water from low-denatured defatted soybeans was centrifuged to remove an okara fraction to obtain defatted soymilk.

2) The defatted soymilk was adjusted to pH 4.5, and subjected to isoelectric precipitation. The acid-precipitated curd was recovered by centrifugation and was neutralized.

3) Subsequently, this neutralized solution was subjected to preliminary heating at 140° C. for 10 seconds, and then spray dried to prepare soybean protein isolate (SPI). On the other hand, this neutralized solution was subjected to preliminary heating at 140° C. for 10 seconds, and 0.5 unit of a transglutaminase preparation "Activa" (Ajinomoto, Co., hereinafter referred to as "TGase") per 1 g of crude protein was added thereto. The mixture was reacted at 50° C. for 30 minutes, and then heated at 140° C. for 10 seconds, followed by spray drying to prepare TGase-treated soybean protein isolate "TG-SPI."

The various soy protein ingredients thus obtained and the measurement results of LCI, i.e., estimated LP contents, of the ingredients are listed in Table 1.

TABLE 1

| Soy Protein Ingredient | Content | LCI Value |
|---|---|---|
| 11S protein (A) | Unheated type | 21 |
| 11S protein (B) | Heat-denatured type | |
| LP (A) | Unheated type | 55 |
| LP (B) | Heat-denatured type | |
| 7S protein (A) | Unheated type | 16 |
| 7S protein (B) | Heat-denatured type | |
| Protein free of poorly-soluble LP | 2:2:1 Mixture of 11S protein (A), LP (A) and 7S protein (A) | 34 |
| LP-free protein | 2:1 Mixture of 11S protein (A) and 7S protein (A) | 19 |
| SPI | Soybean protein isolate | 39 |
| TG-SPI | TGase-treated soybean protein isolate | — |

Experimental Example 1

Preparation of Hard Soy Protein Gel and Evaluation of Gel Physical Properties and Taste Each of the various soy protein ingredients listed in Table 1 was dissolved in water at a concentration of 12%, adjusted to pH 7.5, and subjected to defoaming by centrifugation to obtain slurry. For the slurry to which TGase was added, 3.2 units of TGase per 1 g of crude protein of the soy protein ingredient was added, and the mixture was filled into a casing tube and subjected to enzyme reaction at 55° C. for 30 minutes. Subsequently, the mixture was heated at 90° C. for 30 minutes, then placed in the refrigerator overnight, and cooled to room temperature to obtain a soy protein gel for evaluating physical properties. The soy protein gel was released from the casing, and subjected to measurement by a rheometer (Yamaden Co., Ltd.) to analyze the rupture strength and the rupture distortion (measurement conditions: sample height 20 mm; 5 mm diameter ball plunger; and 1 mm/second). The rupture load and the rupture distortion thus obtained were used to determine the rupture stress ($\times 1000$ N/m$^2$) and the rupture strain rate (%) by applying Equations 2 and 3, respectively. Further, the gel was tasted and its taste was scored on a scale of 0 to 10 to evaluate the texture. The results are shown in Tables 2 and 3.

TABLE 2

Effects of TGase on physical properties of gel of denatured soy protein ingredients

| | Soy Protein Ingredient | TGase Addition | Rupture Stress | Rupture Strain Rate | Taste | Texture |
|---|---|---|---|---|---|---|
| T-1 | 11S protein (B) | Yes | 172 | 83 | 10 | Konjac-like flexibility |
| T-2 | 7S protein (B) | Yes | 221 | 87 | 9 | Konjac-like flexibility |
| T-3 | LP (B) | Yes | 67 | 69 | 4 | Soft-konjac-like flexibility |
| T-4 | SPI (B) | Yes | 142 | 80 | 5 | Konjac-like flexibility |
| T-5 | TG-SPI (B) | No | 27 | 70 | 5 | Sticky |
| T-6 | 11S protein (B) | No | 4 | 42 | 9 | Gooey |
| T-7 | 7S protein (B) | No | 44 | 71 | 7 | Bracken starch dumpling-like flexibility |
| T-8 | LP (B) | No | 4 | 31 | 2 | Gooey |
| T-9 | SPI (B) | No | 17 | 50 | 4 | Sticky |

As shown in Table 2, the denatured-type soy protein ingredients had greater rupture stress and rupture strain rate in the TGase-added group as compared with TGase-free group. They were all modified toward a hard texture with flexibility. In the comparison at the same concentration, 7S(B) and 11S (B) gave the most flexible and hard texture and were good in taste. By contrast, LP(B) had insufficient flexibility and hardness and poor in taste, while SPI(B) had a hard texture with flexibility but was inferior to 7S(B) and 11S(B) in taste.

One of the objects of the present invention is to provide a "soy protein gel having a hard texture with flexibility." To obtain such a gel, the present inventors set the satisfactory goals as: a taste score of 8 to 10, a rupture stress of 50 to 1000 ($\times 1000$ N/m$^2$) and a rupture strain rate of 50 to 100%. Accordingly, in this experimental example, the samples T-1 (11S(B), TGase-treated) and T-2 (7S(B), TGase-treated) could achieve the object. Thus, it was of importance to reduce the LP fraction in the conventional soybean protein isolates.

TABLE 3

Effects of TGase on physical properties of gel of undenatured soy protein ingredient

| | Soy Protein ingredient | TGase Addition | Rupture Stress | Rupture Strain Rate | Taste | Texture |
|---|---|---|---|---|---|---|
| T-10 | 11S protein (A) | Yes | 119 | 79 | 10 | Soft-konjac-like flexibility |
| T-11 | 7S protein (A) | Yes | 136 | 84 | 8 | Konjac-like flexibility |
| T-12 | LP (A) | Yes | 9 | 23 | 3 | Gooey |
| T-13 | 11S protein (A) | No | 20 | 38 | 8 | relatively tofu-like |
| T-14 | 7S protein (A) | No | 55 | 73 | 6 | Bracken starch dumpling-like flexibility |
| T-15 | LP (A) | No | 3 | 6 | 1 | Liquid form |

As shown in Table 3, the undenatured-type soy protein ingredients also had greater rupture stress and rupture strain rate in the TGase-added group as compared with the TGase-free group. They were all modified toward a hard texture with flexibility. However, LP(A) showed little modification even when TGase was added. Thus, it was shown that to obtain a hard and tasty soy protein gel with flexibility, the process of reducing the LP fraction is essential.

Experimental Example 2

Preparation and Evaluation of Physical Properties of Soft Soy Protein Gel

As shown in Table 4, each soy protein ingredient was dissolved in water at a given concentration (% by weight) in the resulting mixture, adjusted to pH 7.5, and subjected to defoaming by centrifugation to obtain a slurry material. To the slurry, 3.2 units of TGase per 1 g of crude protein of the soy protein ingredient was added, and the mixture was filled into a hexagonal container, which was then capped. The enzymatic reaction was carried out at 55° C. for 30 minutes. Subsequently, the mixture was heated at 90° C. for 30 minutes, then placed in a refrigerator overnight, and then cooled to room temperature to obtain a soy protein gel for evaluating physical properties. Evaluation of the soy protein gel for the physical properties, taste and texture was conducted according to the same manner as that described in Experimental Example 1 except that a larger plunger (cylindrical plunger of 15 mm diameter) was used as the rheometer plunger so that gel properties with a soft texture could be evaluated.

TABLE 4

Physical properties of TGase-treated gel at each concentration of the soy protein gel

| | Soy Protein ingredient | Concentration | Rupture Stress | Rupture Strain Rate | Taste | Texture |
|---|---|---|---|---|---|---|
| T-16 | Protein free of poorly-soluble LP | 6.6 | 0.4 | 69 | 8 | Liquid form |
| T-17 | Protein free of poorly-soluble LP | 8.3 | 3 | 60 | 8 | Gooey |

TABLE 4-continued

Physical properties of TGase-treated gel at each concentration of the soy protein gel

| | Soy Protein ingredient | Concentration | Rupture Stress | Rupture Strain Rate | Taste | Texture |
|---|---|---|---|---|---|---|
| T-18 | Protein free of poorly-soluble LP | 9.9 | 13 | 63 | 8 | Slightly smooth |
| T-19 | LP-free protein | 6.6 | 0.4 | 52 | 9 | Liquid form |
| T-20 | LP-free protein | 8.3 | 7 | 50 | 9 | Slightly smooth |
| T-21 | LP-free protein | 9.9 | 24 | 55 | 9 | Smooth |
| T-22 | 11S protein (A) | 6.6 | 0.9 | 85 | 10 | Liquid form |
| T-23 | 11S protein (A) | 8.3 | 4 | 48 | 10 | Gooey |
| T-24 | 11S protein (A) | 9.9 | 13 | 50 | 10 | Smooth |

Regarding one of the objects of the present invention, i.e. to provide a "soy protein gel having a soft texture that provides a smooth slide down the throat", the present inventors set the satisfactory goals as a taste score of 8 to 10, a rupture stress of 5 to 50 (×1000 N/m$^2$) and a rupture strain rate of 40 to 80%. Accordingly, in Table 4, the conditions that could achieve the object were conditions T-18, T-20, T-21, and T-24. Thus, the object can be achieved for the first time only by reducing the LP fraction from a conventional soybean protein isolate.

Experimental Example 3

Influence of Oil, Salt and pH on Physical Properties of Soft Soy Protein Gel

11S Protein (A) was dissolved in water at a concentration of 12%, and palm oil "Palm Ace 10" (Fuji Oil Co. Ltd), salt, and sugar were dissolved or dispersed in the solution, which was then adjusted to the pH indicated in Table 5 (pH 5.5 to 8.5). The mixture was then subjected to defoaming by centrifugation to obtain a slurry material. To the slurry, 3.2 units of TGase per 1 g of crude protein of the soy protein ingredient was added, and the mixture was filled into a casing tube and subjected to enzymatic reaction at 55° C. for 30 minutes. Subsequently, the mixture was heated at 95° C. for 30 minutes, then placed in a refrigerator overnight, and then cooled to room temperature to obtain a soy protein gel for evaluating physical properties. Evaluation of the soy protein gel for the physical properties, taste and texture was conducted according to the same manner as that described in Experimental Example 1. The samples having scores of 8 or higher out of 10 were indicated by circle (o).

TABLE 5

Influence of other ingredients added to material containing soy protein ingredient on physical properties

| | Fat and Oil (%) | Salt (%) | pH | Rupture Stress | Rupture Strain Rate | Taste | Texture |
|---|---|---|---|---|---|---|---|
| T-25 | 0 | 0 | 7.5 | 148 | 88 | ○ | Konjac-like flexibility |
| T-26 | 5 | 0 | 7.5 | 97 | 87 | ○ | Soft-konjac-like flexibility |
| T-27 | 10 | 0 | 7.5 | 97 | 83 | ○ | Soft-konjac-like flexibility |
| T-28 | 17 | 0 | 7.5 | 104 | 82 | ○ | Soft-konjac-like flexibility |
| T-29 | 0 | 0.6 | 7.5 | 55 | 50 | ○ | Slightly dry and crumbling |
| T-30 | 0 | 1.2 | 7.5 | 37 | 35 | ○ | Dry and crumbling |
| T-31 | 0 | 1.8 | 7.5 | 148 | 67 | Strong salty taste | flexible and crunchy |
| T-32 | 0 | 0 | 5.5 | 22 | 32 | Strong acid taste | Dry and crumbling |
| T-33 | 0 | 0 | 6.5 | 104 | 65 | ○ | flexible and crunchy |
| T-34 | 0 | 0 | 8.5 | 197 | 93 | ○ | Konjac-like flexibility |

In some gels, their taste and physical properties were influenced by other ingredients added to the material containing the soy protein ingredient. Specifically, the gel tasted strongly of acid at pH 5.5 (T-32) and had a dry and crumbling texture, while a dry and crumbling texture resulted when the salt was added to the material containing the soy protein ingredient at a concentration of 1.2% by weight (T-30). Each gel was subjected to SDS-PAGE (electrophoresis) to investigate the extent of intermolecular crosslinking (amount of polymers) formed by TGase. All the gels investigated formed crosslinking at the same extent. Thus, these phenomena were thought to be associated with the solubility, water retention properties, and gel forming ability of soy protein under the respective conditions, but not to be resulted from the reduction of the reactivity of TGase. Accordingly, when applications to daily dishes, in which a certain amount of salt is required, are desired, it is expected to achieve the desired object by resources, for example, increasing slightly the concentration of the soy protein ingredient with increasing pH to a certain degree. In fact, the present inventors will demonstrate in Examples that such an effort can successfully be made.

While the rupture stress was slightly lowered by fats and oils, no reduction in the rupture strain rate was observed and the flexible texture was retained. This would be because fats and oils were liable to cause phase separation from the solution of the soy protein ingredient due to the reduction of the LP content. Although data were not shown, no noticeable change was observed in the physical properties of materials containing soy protein ingredients even when 5% sugar was added to the material, suggesting that they had potential applications in preparation of sweets such as desserts. Such applications will be described hereinafter in Application Examples.

Application Example 1

Food Product Utilizing Soy Protein Gel

Raw-Scallop-Flavored Soy Protein Gel

Seasoned solution (H) was prepared by dissolving 0.05 part by weight of sodium glutamate, 0.5 part by weight of glycine, 0.2 part by weight of alanine, 0.1 part by weight of salt, 0.3 part by weight of sodium succinate, 0.2 part by weight sugar, and 0.05 part by weight of scallop extract "TC-F2" (Yaizu Suisankagaku Industry Co. Ltd.) in 8.6 parts by weight of cold water.

In 73.3 parts by weight of cold water, 12.9 parts by weight of powdered 11S protein (A) was dissolved, and 10 parts by weight of the seasoned solution (H) described above was added to the solution. The mixture was adjusted to pH 8.0 and subjected to defoaming by centrifugation to obtain slurry material. A solution in which TGase was dissolved in cold water at a concentration of 10% by weight was added to the slurry material at a concentration of 1.6% by weight (based on the solid content weight of the soy protein ingredient), and the mixture was filled into a casing tube of 6.4 cm folding diameter (the concentration of the soy protein ingredient was 12% by weight) and subjected to the enzymatic reaction at 55° C. for 30 minutes. Subsequently, the mixture was heated at 95° C. for 30 minutes, then placed in a refrigerator overnight, and then cooled to room temperature to obtain a soy protein gel. The soy protein gel was evaluated for the physical properties, taste and texture according to the same manner as that described in Experimental Example 1. Meanwhile, the soy protein gel was cross-sectioned into circular slices of 1.5 cm thickness, and cuts were made in a depth of 5 mm on both sides of the cylindrical gel to form a pattern of dapples with a width of about 1 mm (a fine diagonal lattice pattern). These slices were cooked like scallop fiber and tasted.

Application Example 2

Food Product 2 Utilizing Soy Protein Gel

Apricot-Kernel-Flavored Soy Protein Gel

Seasoned solution (N) was prepared by dispersing 20 parts by weight of commercially available powdered sweet apricot kernels in 60 parts by weight of warm water, centrifuging it to collect 40 parts by weight of the supernatant, cooling it and adding 5 parts by weight of sugar thereto. In T-40 shown in Table 7, 0.05 part by weight of a stevia sweetener preparation (Dainihon Ink Chemical Co.) was used instead of 5 parts by weight of sugar. The solution thus prepared was used as a substitute for seasoned solution (N).

Each of 24 parts by weight of powder of the previously prepared poorly-soluble LP-free protein, the LP-free protein, and 11S protein (A) was dissolved into 136 parts by weight of cold water, and then 40 parts by weight of seasoned solution (N), described above was added. The mixture was adjusted to pH 7.5 and subjected to defoaming by centrifugation to obtain a slurry material. A solution in which TGase was dissolved in cold water at a concentration of 10% by weight was added to the slurry material so that 3.2 units of TGase per 1 g of the crude protein of the soy protein ingredient was added to the material. Subsequently, 60 parts by weight of the mixture was filled into a sealable plastic container (the concentration of the soy protein ingredient was 9.9% by weight), placed in a warm bath at 55° C., then gradually heated to 90° C. at a rate of 2° C. per minute and maintained at 90° C. for 20 minutes. The container was then placed in a refrigerator overnight, and then cooled to room temperature to obtain a soy protein gel. The seal was removed from the container and the soy protein gel was evaluated for the physical properties, taste and texture according to the same manner as that described in Experimental Example 1.

TABLE 6

| | Preparation | Concentration of soy protein ingredient | Rupture Stress | Rupture Strain Rate | Taste | Texture |
|---|---|---|---|---|---|---|
| T-35 | Cut into a pattern of dapples | 12 | 123 | 67 | Scallop flavor | Soft-konjac-like |
| T-36 | Not cut into a pattern of dapples | 12 | Not determined | Not determined | Scallop flavor | raw-scallop-like |

Although T-35 did not produce a raw-scallop-like texture, a fibrous feel produced by a bundle of gels could be felt by the tongue when appropriate cuts were made to the gel. This gel had a relatively smooth texture. Heated scallop had an overwhelming fibrous texture, whereas raw scallop were less fibrous. This gel had a relatively smooth texture and produced a moderate fibrous feel. Thus, the soy protein gel obtained in the present invention can have a wider spectrum of texture by cooking or processing it in a well-known way such as making cuts into the gel. When the "raw-scallop-flavored soy protein gel" of T-36, cut into a pattern of dapple, was used as a material for sushi with a sweet soy sauce seasoning, it had excellent appearance due to the cuts in a dapple pattern, which stimulated appetite, and in addition it tasted delicious.

TABLE 7

| | Soy protein ingredient | Concentration of soy protein ingredient | Rupture Stress | Rupture Strain Rate | Taste | Texture |
|---|---|---|---|---|---|---|
| T-37 | Poorly-soluble LP-free protein | 9.9 | 6 | 48 | Slightly unpleasant taste | Slightly smooth |
| T-38 | LP-free protein | 9.9 | 9 | 45 | Apricot-kernel taste ○ | Smooth |
| T-39 | 11S protein (A) | 9.9 | 6 | 40 | Apricot-kernel taste ○ | Slightly smooth |

TABLE 7-continued

| Soy protein ingredient | Concentration of soy protein ingredient | Rupture Stress | Rupture Strain Rate | Taste | Texture |
|---|---|---|---|---|---|
| T-40 | LP-free protein | 9.9 | 10 | 44 | Refreshing apricot-kernel taste ○ | Smooth |

The unpleasant feel of taste derived from soybean which was felt in the T-37 gel using the poorly-soluble LP free-protein was not felt in the T-38 gel using the LP-free protein, or in the T-39 gel using 11S (A). The T-38 and T-39 gels had apricot-kernel taste without an unpleasant taste. Regarding the texture, the T-38 gel was smoother and more preferable than the T-39 gel. The T-40 gel using a stevia sweetener preparation instead of sugar also showed a refreshing apricot-kernel taste and was preferable. The "apricot kernel jelly made from soybeans" of T-40 was cut into cubes and soaked in syrup, and filled in retort bags and heat-sterilized. This jelly retained its shape even after storage in a refrigerator and was tasted delicious.

Application Example 3

Food Product 3 Utilizing Soy Protein Gel

Kamaboko-Type Soy Protein Gel

Seasoned solution (T) was prepared by dissolving 0.02 part by weight of sodium glutamate, 0.7 part by weight of salt, 0.7 part by weight sugar, and 1.5 parts by weight of "Fish Extract HN-55" (SenmiEkisu Co., Ltd) in 7.1 parts by weight of cold water.
In 69.6 parts by weight of cold water, 15.7 parts by weight of the previously prepared powdered 11S protein (A) was dissolved, and 10 parts by weight of seasoned solution (T) described above was added to the solution, and the mixture was adjusted to pH 8.0 to obtain a slurry material. A solution in which TGase was dissolved in cold water at a concentration of 10% by weight was added to the slurry material so that 3.2 units of TGase per 1 g of the crude protein of the soy protein ingredient was added.
Subsequently, the mixture was filled into an inverse hog-backed shaped container (the concentration of the soy protein ingredient was 15% by weight), and a kamaboko plate was placed on the container and set in the Combi oven at 55° C. for 30 minutes, then elevated to 90° C. and heated for 30 minutes. The gel was releases from the container and wrapped together with the kamaboko plate, and placed in a refrigerator overnight, and then cooled to room temperature to obtain a soy protein gel. The wrap was removed from the gel thus obtained, which was then evaluated for the physical properties, taste and texture according to the same manner as that described in Experimental Example 1.

TABLE 8

| Soy protein ingredient | Concentration of soy protein ingredient | Rupture Stress | Rupture Strain Rate | Taste | Texture |
|---|---|---|---|---|---|
| T-41 | 11S (A) | 15 | 201 | 62 | Kamaboko taste ○ | Kamaboko-like |

When salt is present in the material at a concentration about 1%, a water-retentive gel network having water retention properties is hardly constructed and a dry and crumbling texture would result in the case where the concentration of the soy protein ingredient is about 12% (pH 7.5) as in T-30 in Table 5. Thus, when the concentration of a soy protein ingredient was increased to as high as 15%, as in T-41, a kamaboko-like flexible texture could be obtained even if the salt concentration was higher than 0.7%. This is probably because the amount of the material for constructing the network would increase due to the increase of the concentration of the soy protein ingredient, and the water retention properties of the gel network was increased by adjusting to slightly higher pH of 8.0 to be remote from the isoelectric point.

Thus, the soy protein gel of the present invention can be utilized in applications for preparing daily dishes. For example, a "kamaboko-like soy protein gel," which has kamaboko-like taste and texture can be prepared without using fish mince whose price keeps rising in recent years.

In addition, when an 11S protein-containing material in a slurry form was heated in the presence of salt, the gel tended to become clouded in bright white color and became more kamaboko-like in terms of color tone. When the soy protein gel obtained for T-41 was boiled in the oden soup, the soup was rapidly permeated within the gel. Therefore, the gel was sufficiently seasoned with retaining its shape better and was tasted delicious.

Application Example 4

Food Product 4 Utilizing Soy Protein Gel

Substitute for Other Ingredients

Dough for preparing the T-42 gel was prepared by kneading 67 parts by weight of frozen fish mince (Pollack FA: 75% water content) with 2.1 parts by weight of salt and adding 33 parts by weight of cold water to the kneaded mince.
Dough for preparing the T-43 gel was prepared by kneading 45 parts by weight of the frozen fish mince, 55 parts by weight of a solution of a soy protein ingredient in which the LP content had been reduced (paste of 11S protein (A) (80% water content)), 2.1 parts by weight of salt, and TGase in an amount such that 8 units of TGase per 1 g or protein of the dough was contained.
Each dough was defoamed under vacuum and filled into a casing tube and heated at 30° C. for 30 minutes and then at 90° C. for 30 minutes. The dough was then placed in a refrigerator overnight, and cooled to room temperature. Subsequently, the dough was released from the casing, and evaluated for its physical properties according to the same manner as that described in Experimental Example 1 except that a cylindrical plunger of 3 mm diameter was used as the plunger. The measurement by the cylindrical plunger of 3 mm diameter was also carried out with respect to the T-41 gel (T-44), and on commercially available kamaboko (T-45 and T-46). In the results shown in Table 9, although the value for rupture stress obtained using the cylindrical plunger of 3 mm diameter is higher than that obtained using the cylindrical plunger of 5 mm diameter, relative comparison is possible among the data shown in Table 9. While it was almost possible to express the flexibility of gel as rupture strain rate X, as the index that could express the elasticity of gel in objective terms, the rupture index Z (Equation 4) was used to evaluated the physical properties.

TABLE 9

| | Content | Rupture Stress Y (φ 3 mm) | Rupture Strain Rate X (φ 3 mm) | Rupture index Z (φ 3 mm) | Texture |
|---|---|---|---|---|---|
| T-42 | No substitution | 424 | 60 | −22 | Kamaboko-like |
| T-43 | Substitution for half of the dry mass | 483 | 51 | −31 | Kamaboko-like |
| T-44 | Substitution for the entire of the dry mass | 516 | 65 | −41 | Kamaboko-like |
| T-45 | Commercially available plated kamaboko | 540 | 58 | −38 | Kamaboko-like |
| T-46 | Commercially available molded kamaboko | 276 | 50 | −31 | Kamaboko-like |

The 100 percent minced fish meat product, commercially available plated kamaboko, and commercially available molded kamaboko (T-42, T-45 and T-46) had the rupture strain rate X values of X>50% and the rupture index Z values of Z<−20%, and their texture was flexible, kamaboko-like, and elastic. T-45 was a relatively high quality kamaboko and was excellent in hardness, flexibility and elasticity, while T-46 was a medium grade kamaboko sausage with hardness, flexibility and elasticity. T-42 was excellent in hardness and flexibility and had a texture which was fallen within the category of kamaboko-like texture, though it was relatively poor in elasticity. Accordingly, the textures of T-42, T-45 and T-46 were all sufficient to be recognized as kamaboko-like textures, though they differed in the degrees of hardness, flexibility and elasticity.

According to the measurements obtained in this application example, products with rupture stress Y of 250 to 600 (×1000 N/m$^2$) and rupture strain rate X of 50% or more, and rupture index Z of −20% or lower were expected to have texture which was fallen within the category of kamaboko-like texture.

When T-43 was evaluated, it still had a texture within the category of kamaboko-like texture even after half of the fish mince was replaced with soy protein and was processed into a hybrid kamaboko containing minced fish and a soy protein material without giving any significantly adverse effect on the physical properties of kamaboko which was characterized by flexible texture. This was found to be useful when fish mince was scarce or price for fish mince rises considerably. Furthermore, T-44 was found to be useful to produce a kamaboko-like texture without using any fish mince.

Namely, by using the soy protein ingredient whose LP content has been reduced, taste and color tone became good, indicating that such ingredient is suitable in applications to light-taste food products such as kamaboko.

In addition, by preparing an emulsion by mixing 100 parts by weight of the soy protein ingredient whose LP content has been reduced with 10 parts by weight of rapeseed oil, a kamaboko-like flexible texture could be produced without making any significant changes to rupture strain rate X and rupture index z, though the rupture stress Y value was decreased to 0.8-fold. It was possible to finish a product as a more whitish one than T-42.

The invention claimed is:

1. A soy protein gel obtained by heating a material comprising a soy protein ingredient, wherein:
    the soy protein ingredient has a Lipophilic Protein Content Index (LCI) value of 38% or less,
    the material comprising the soy protein ingredient has been subjected to the action of a protein crosslinking enzyme, and heating, to form the soy protein gel, and
    the gel has a rupture stress of 50 to 1000 (×1000 N/m$^2$) and a rupture strain rate of 50 to 100%.

2. The soy protein gel according to claim 1, wherein the soy protein ingredient is selected from whole soymilk, defatted soymilk, soybean protein isolate, 7S soy protein, and 11S soy protein.

3. A food product comprising the soy protein gel according to claim 1.

4. A method for producing a food product comprising a soy protein gel, said method comprising mixing the soy protein gel according to claim 1 and a food product.

5. A method for producing a food product comprising a soy protein gel, said method comprising substituting the soy protein gel according to claim 1 for a raw material during preparation of a food product.

6. A method for producing a soy protein gel, comprising subjecting a material comprising a soy protein ingredient having a Lipophilic Protein Content Index (LCI) value of 38% or less to the action of a protein crosslinking enzyme, wherein salt is added to the soy protein ingredient in an amount of 1% or less by weight based on the material comprising the soy protein when subjecting the material to the action of a protein crosslinking enzyme, and then heating, and wherein the gel has a rupture stress of 50 to 1000 (×1000 N/m$^2$) and a rupture strain rate of 50 to 100%.

7. The method according to claim 6, wherein the pH of the material comprising the soy protein ingredient is 6 to 9 when subjecting the material to the action of a protein crosslinking enzyme.

8. The method according to claim 6, wherein the soy protein ingredient having an LCI value of 38% or less is not subjected to preliminary heating at a temperature of its denaturation temperature or higher, and wherein, after subjecting to the action of a protein crosslinking enzyme, the material comprising the soy protein ingredient is heated at a temperature of the denaturation temperature of the soy protein ingredient or higher.

9. The method according to claim 6, wherein the soy protein ingredient having an LCI value of 38% or less is subjected to preliminary heating at a temperature of its denaturation temperature or higher, and wherein, after subjecting to the action of a protein crosslinking enzyme, the material comprising the soy protein ingredient is heated at a temperature sufficient to inactivate the enzyme.

10. A method for producing a food product comprising a soy protein gel, said method comprising:
    blending a soy protein ingredient having a Lipophilic Protein Content Index (LCI) value of 38% or less and a protein crosslinking enzyme to create a blend,
    mixing the blend with a raw material during preparation of a food product to create a mixture,
    subjecting the mixture to the action of the protein crosslinking enzyme, and heating to form the food product comprising a soy protein gel,
    wherein the soy protein gel has a rupture stress of 50 to 1000 (×1000 N/m$^2$) and a rupture strain rate of 50 to 100%.

* * * * *